United States Patent [19]
Fletcher

[11] Patent Number: 5,583,824
[45] Date of Patent: Dec. 10, 1996

[54] TELEMETRY DATA TRANSMISSION CIRCUIT HAVING SELECTABLE CLOCK SOURCE

[75] Inventor: Deane D. Fletcher, Plano, Tex.

[73] Assignee: Whitehall Corporation, Dallas, Tex.

[21] Appl. No.: 126,304

[22] Filed: Sep. 23, 1993

[51] Int. Cl.⁶ .............................. G01V 1/22; H03M 1/00
[52] U.S. Cl. .................................. 367/21; 367/79
[58] Field of Search ...................... 367/21, 63, 79, 367/134; 340/855.3; 371/5.4, 8.2, 11.2; 455/8, 56.1

[56] References Cited

U.S. PATENT DOCUMENTS

| | | | |
|---|---|---|---|
| 2,614,143 | 10/1952 | Williams | 327/171 |
| 2,708,742 | 5/1955 | Harris | 340/7 |
| 2,782,059 | 2/1957 | Stranberg | 285/247 |
| 2,900,536 | 8/1959 | Palo | 310/9.6 |
| 3,177,016 | 4/1965 | Holmgren | 285/247 |
| 3,258,739 | 6/1966 | Hurley | 340/10 |
| 3,333,236 | 7/1967 | Schloss | 340/8 |
| 3,418,624 | 12/1968 | Massa | 340/9 |
| 3,739,326 | 6/1973 | Kerr et al. | 340/7 |
| 3,764,848 | 10/1973 | Berlincourt | 315/55 |
| 3,940,558 | 2/1976 | Gabbard et al. | 371/11.2 |
| 3,996,553 | 12/1976 | Siems et al. | 340/15 |
| 4,012,649 | 3/1977 | Cook et al. | 310/8.3 |
| 4,092,629 | 5/1978 | Siems et al. | 340/15 |
| 4,160,229 | 7/1979 | McGough | 340/7 |
| 4,204,188 | 5/1980 | Weichart et al. | 367/154 |
| 4,437,689 | 3/1984 | Goebel et al. | 285/246 |
| 4,491,939 | 1/1985 | Carpenter | 367/20 |
| 4,733,379 | 3/1988 | Lapetina et al. | 367/20 |
| 4,736,969 | 4/1988 | Fouts | 285/247 |
| 4,782,470 | 11/1988 | Poturnicki et al. | 367/157 |
| 4,787,069 | 11/1988 | Beauducel et al. | 367/21 |
| 4,819,216 | 4/1989 | Fraioli | 367/154 |
| 4,890,303 | 12/1989 | Bader | 375/107 |
| 4,901,287 | 2/1990 | Hathaway et al. | 367/3 |
| 4,951,265 | 8/1990 | Buckles | 367/18 |
| 5,008,581 | 4/1991 | Kumada et al. | 310/323 |

FOREIGN PATENT DOCUMENTS

| | | |
|---|---|---|
| 2137750 | 10/1984 | United Kingdom . |
| 2145226 | 3/1985 | United Kingdom . |

OTHER PUBLICATIONS

Proffitt, Jack M. "A History of Innovation in Marine Seismic Data Acquisition", *Geophysics: The Leading Edge of Exploration*, p. 24 (Mar. 1991).

*Primary Examiner*—Nelson Moskowitz
*Attorney, Agent, or Firm*—Hitt Chwang & Gaines, P.C.

[57] ABSTRACT

Disclosed is a telemetry data transmission circuit for a towed hydrophone streamer, the streamer comprised of a plurality of series-coupled modules. The transmission circuit comprises: (1) a slave clock input in a first module capable of receiving a master timing signal from a master clock source located in a second module, the master timing signal capable of synchronizing an operation of the transmission circuit to allow the transmission circuit to place local telemetry data on a data bus coupled to the transmission circuit and running a length of the streamer, (2) a local clock input in the first module capable of receiving a local timing signal from a local clock source located in the first module, the local timing signal alternatively capable of synchronizing the operation of the transmission circuit and (3) a clock source selection circuit capable of allowing the local clock source to synchronize the operation of the transmission circuit as a function of a condition of the master timing signal.

27 Claims, 4 Drawing Sheets

TELEMETRY DATA TRANSMISSION CIRCUIT HAVING SELECTABLE CLOCK SOURCE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright protection whatsoever.

TECHNICAL FIELD OF THE INVENTION

The present invention is directed, in general, to collection and transmission of data within towed acoustic arrays used in geophysical exploration and, more specifically, to a circuit for allowing a local clock source to synchronize transmission of the data when a remote, master clock signal malfunctions.

BACKGROUND OF THE INVENTION

It is now common practice to explore the oceans of the earth for deposits of oil, gas and other valuable minerals by seismic techniques in which an exploration vessel imparts an acoustic wave into the water, typically by use of a compressed air "gun." The acoustic wave travels downwardly into the sea bed and is reflected at the interfaces between layers of materials having varying acoustic impedances. The wave travels back upwardly where it is detected by microphone or "hydrophone" elements in a streamer towed by the vessel to yield information regarding characteristics of the underwater material and structures.

A towed streamer comprises a plurality of pressure-sensitive hydrophone elements enclosed within a waterproof jacket and electrically coupled to recording equipment onboard the vessel. Each hydrophone element within the streamer is designed to convert the mechanical energy present in pressure variations surrounding the hydrophone element into electrical signals. Due to its extreme length (on the order of miles), the streamer is often divided into a number of separate sections or "modules" that can be decoupled from one another and that are individually waterproof. Individual streamers can be towed in parallel through the use of paravanes to create a two dimensional array of hydrophone elements. Data buses running through each of the modules in the streamer carry the signals from the hydrophone elements to the recording equipment (so-called "acoustic data").

In addition to acoustic data, it is also important to collect and transmit data concerning operational status of the array to the vessel (so-called "nonacoustic data"). Nonacoustic data comprises physical characteristics of interest regarding the operation of each module, including whether water has invaded a module in the streamer, module temperature, module depth and power supply voltage.

It is not uncommon for individual modules to fail during operation of the streamer or during storage or deployment. Failure can occur due to saltwater invasion, shorting electronic components within the streamer. The electronic components can fail by overheating, handling excess power or simply by chance. Mechanical flexing and compressing of the streamer can cause damage, too.

Today, many towed arrays have digital data channels. With digital data transmission, data transmission rates are higher and, with proper attention to electromagnetic interference, data fidelity is maintained from the hydrophone to the recording equipment.

For instance, U.S. Pat. No. 3,996,553, that issued on Dec. 7, 1976 is directed to a plurality of data acquisition units connected to a central signal processor through a common digital telemeter link. The telemeter link includes a data channel, an interrogation channel and a control channel. The central signal processor sends an interrogation signal through the interrogation channel to the data acquisition units. As each data acquisition unit recognizes the interrogation signal, it transmits its acquired data back up to the central processor through the data channel. Any selected data acquisition unit, when it receives a control signal through the control channel at the same time that it receives an interrogation signal through the interrogation channel, can be caused to perform a function different from all other units. The signal propagation velocity through the control channel is different from the signal propagation velocity through the interrogation channel. One of the two signals may be transmitted through the faster channel at a selected time later than the other of the two signals is transmitted through the slower channel. The selected time difference between the transmission of the two signals is proportional to the ratio of signal propagation delay difference between channels. Accordingly, the signal propagating through the faster channel will overtake and intercept the signal propagating through the slower channel at the selected data acquisition unit. Each data acquisition unit may have one or more input channels. Each input channel is connected in turn to the data channel through a stepping switch or multiplexer. The interrogation signal may exist in one of two or more states. In the first state, the interrogation signal resets the multiplexer, in the second state, the interrogation signal advances the multiplexer to the next input channel in sequence. Thus, this system allows for control signals to command changes of state within the individual multiplexers in the system.

Unfortunately, if the central processor fails to generate the interrogation and control signals properly, the streamer ceases operation, unable to synchronize transmission of data from the data acquisition units. Even if the central processor is functioning, damage to the interrogation or control channels can render the streamer useless.

It is preferable to have a central or master clock source for generating timing signals in a streamer to allow synchronous transmission of data. In some streamers, the master clock source is located in an aftmost module of the streamer. The master clock signal is generated in the aftmost module and transmitted forward, circuitry in more forward modules slaving to the master clock signal to synchronize their operation. However, should the master clock source fail, it is highly desirable to provide an alternative source to assume the role of master source to allow at least a portion of the streamer to continue operation. The prior art has failed to provide for operation of only a portion of a streamer in case a malfunction renders part of the streamer inoperative.

SUMMARY OF THE INVENTION

To address the above-noted deficiencies of the prior art, it is a primary object of the present invention to provide a means by which to allow a portion of a seismic streamer to continue operation even though part of the streamer is malfunctioning. Accordingly, in the attainment of the primary object, the present invention provides a telemetry data transmission circuit for a towed hydrophone streamer, the streamer comprised of a plurality of series-coupled modules, each module having a transmission circuit. The transmission circuit comprises: (1) a slave clock input in a first module capable of receiving a master timing signal from a master clock source located in a second module, the master timing signal capable of synchronizing an operation of the transmission circuit to allow the transmission circuit to place local telemetry data on a data bus coupled to the transmission circuit and running a length of the streamer, (2) a local clock input in the first module capable of receiving a local timing signal from a local clock source located in the first module, the local timing signal alternatively capable of synchronizing the operation of the transmission circuit and (3) a clock source selection circuit capable of allowing the local clock source to synchronize the operation of the transmission circuit as a function of a condition of the master timing signal.

Thus, whereas prior art digital streamers completely lose their ability to transmit data to the vessel upon failure of the synchronizing master clock signal, the present invention allows an alternative, still-functioning module to assume the role of master clock source for more forward modules, allowing the foremost modules to continue operating as a foreshortened streamer.

Each module makes its decision to be a master (providing clocking from its local oscillator) or a slave (receiving clocking from an aftward module) based on a timeout circuit in the module. The timeout circuit has three inputs: (1) the master clock signal from the aftward module, (2) an end-of-data signal from the aftward module and (3) a frame synchronization signal from the aftward module. Upon receipt of a global reset signal (issued via a downlink bus from the towing vessel), the timeout circuit is reset and each module is placed in slave mode. The aftmost module experiences a timeout, causing it to revert to its local clock source (the master mode). Forward modules slave to the master clock signal, now produced in the aftmost module and sent forward.

In a preferred embodiment of the present invention, the master clock signal is generated in the aftmost module and transmitted forward. In the preferred embodiment, the first module is proximate a towing vessel and the second module is distal from the vessel. It is an object of the present invention to provide a transmission circuit that not only can create its own local clock signal, but can transmit its local clock signal forward as a master clock signal. Accordingly, in a preferred embodiment, the local timing signal is transmitted to a third module, the local clock source serving as a master clock source for a transmission circuit in the third module.

In a preferred environment for operation of the present invention, telemetry data from acoustic and nonacoustic sensors in each module are transmitted from the aft end of the streamer forward to the towing vessel. Each module receives data from aft modules, adds local data and retransmits the received and local data forward. It is another object of the present invention to disregard the master clock signal generated in the aftmost module if the aftmost module is not transmitting data reliably (meaning that either the master clock signal, the end-of-data signal or the frame synchronization signal is not functioning properly). In one embodiment of the present invention, the selection circuit allows the local clock source to synchronize the operation of the transmission circuit as a function of a condition of telemetry data on the data bus. Therefore, either a clock failure or a data failure in an aft module triggers operation of the local clock source in the aftmost still-functioning module.

Data are transmitted from module to module in discrete frames. Transmission of the frames is synchronized with a frame synchronization signal generated in the aftmost module and transmitted forward. Each transmission circuit receives a frame of telemetry data on the data bus and retransmits the data on the data bus, adding the local telemetry data (from hydrophones and other nonacoustic sensors) to the frame during the retransmission. If the frame synchronization signal is unreliable, transmission of frames becomes unreliable. Therefore, it is a further object of the present invention to monitor the frame synchronization signal to determine whether it is functioning properly. In one embodiment of the present invention, the transmission circuit is designed to switch from master to local clock sources when the frame synchronization signal is faulty, allowing the local clock source to synchronize the operation of the transmission circuit as a function of a condition of the frame synchronization signal.

Finally, although the transmission circuit of the present invention can be embodied in many forms apparent to those skilled in the art, the transmission circuit is preferably embodied in a programmable logic array.

The foregoing has outlined rather broadly the features and technical advantages of the present invention so that the detailed description of the invention that follows may be better understood. Additional features and advantages of the invention will be described hereinafter that form the subject of the claims of the invention. Those skilled in the art should appreciate that the conception and the specific embodiment disclosed may be readily utilized as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
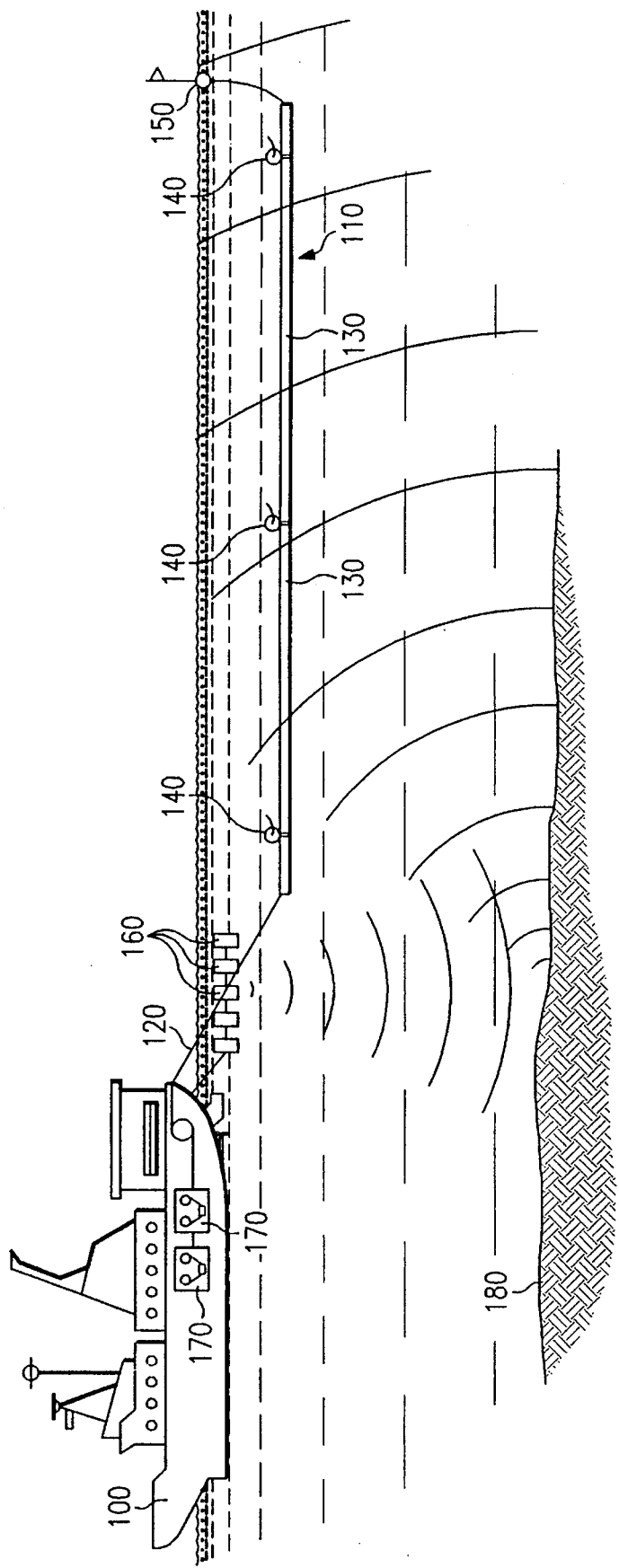
FIG. 1 illustrates an elevational view representing a towed array in operation.

Referring initially to FIG. 1, illustrated is an elevational view representing a towed array in operation. A seismic exploration vehicle 100 tows a streamer cable 110 behind it by way of a tow cable 120. The streamer 110 may comprise a rear buoy 150 if necessary. The streamer 110 is additionally provided with one or more leveling devices or "birds" 140 that serve to regulate the depth of the streamer 110 within the water. The seismic vessel also tows compressed air guns 160 or other sources of acoustic energy that generate an acoustic wave in the water that travels downwardly as shown, reflects at interfaces within the sea bed 180 and is detected by the hydrophones of the streamer 110. As well described in more detail below, the analog signals generated by the hydrophones within the streamer 110 upon receipt of the reflected wave are converted to digital format by analog-to-digital converters also comprised in the streamer 110 and are transmitted in digital form along the streamer 110 and up the tow cable 120 to be recorded by digital recording devices 170 on board the vehicle 100. The streamer 110 comprises a plurality of modules 130. Each module 130 comprises a plurality of hydrophone assemblies (individually referenced in FIG. 2). The modules 130 are connectible to each other in various numbers to make the streamer 110 any length desired, up to a practical maximum length.

Figure 2:
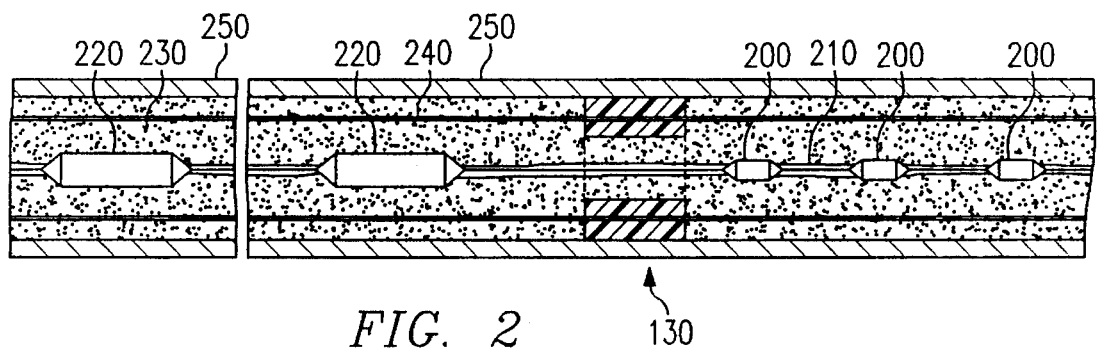
FIG. 2 illustrates a partial cross-sectional view of a typical module 130 of FIG. 1.

Turning now to FIG. 2, illustrated is a partial cross-sectional view of a typical module 130 of FIG. 1. The module 130 comprises a plurality of hydrophone assemblies 200 joined to each other by electrical cables 210. The electrical cables 210 feed into various data processing and transmission units 220 (such as the data collection and relay circuit of the present invention) spread along a length of the module 130. An open-cell foam 230 and tensioning wires 240 reside within a waterproof jacket 250. The foam 230 laterally suspends the hydrophone assemblies 200 and the units 220 therein and provides a surface suitable for longitudinally fixing the various units 220 in a relatively stable spaced-apart relationship along the length of the module 130. Maintenance of this spaced-apart relationship of the hydrophone assemblies 200 is important to proper operation of the array because the phase of signals produced by the hydrophone array in response to pressure wave impingement is a function of hydrophone spacing.

The tension cables 240 are used to carry pulling forces generated by the towing vessel and transmitted down the towed array while it is under tow, thereby relieving the cables 210, the jacket 250 and other structures within the jacket 250 from this stress. A fill fluid having a certain desired specific gravity is entrained within the open cell foam 230. This fill fluid is chosen such that, when taken as a whole, the module has a certain desired specific gravity, preferably a neutral buoyancy with respect to sea water so as to minimize effort on the part of the birds to maintain a desired array depth.

Figure 3:
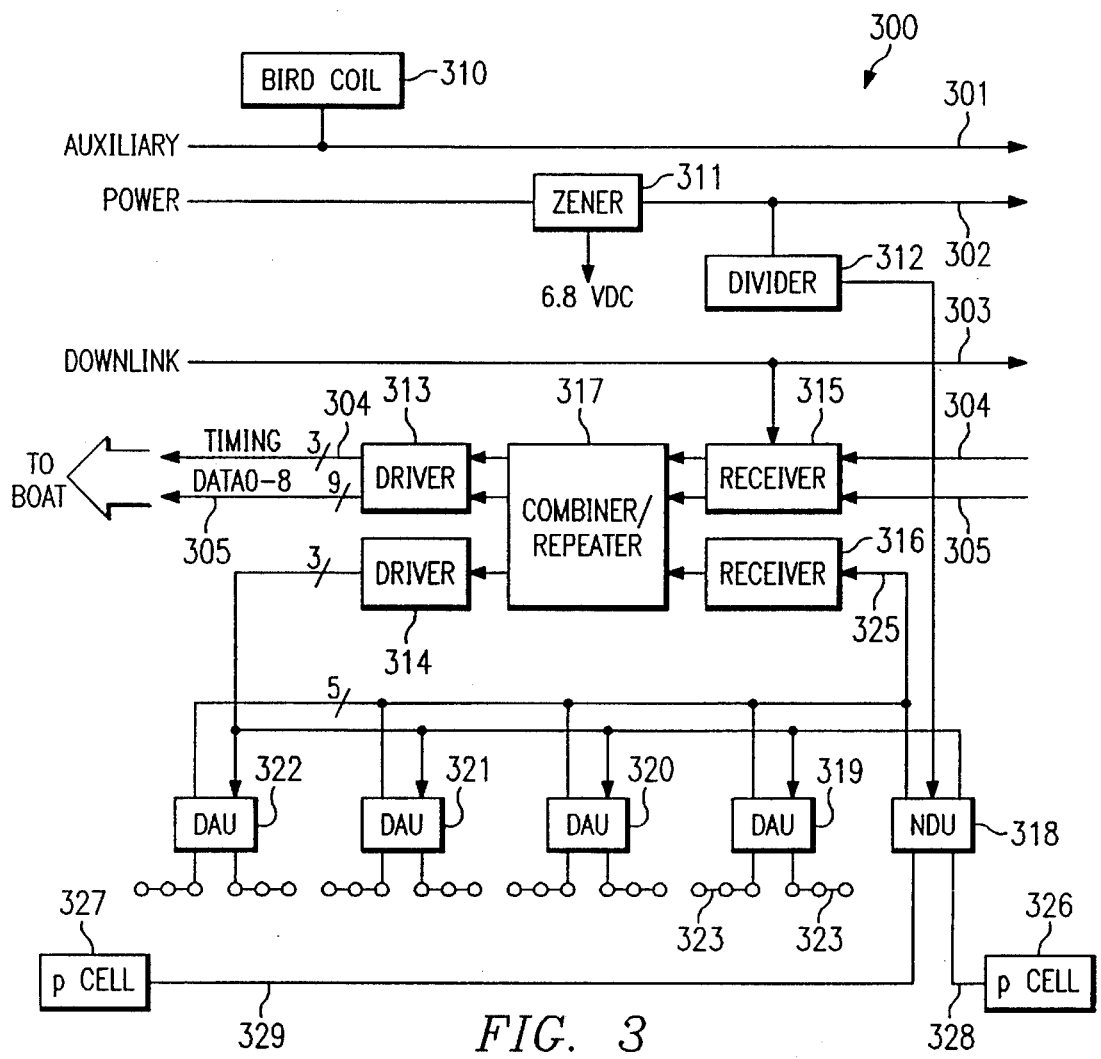
FIG. 3 illustrates a block diagram of an overall digital data system for a towed array that forms the environment for the present invention.

Turning now to FIG. 3, illustrated is a block diagram of an overall digital data system for a towed array module that forms the environment for the present invention. A digital bus 300 is, in a preferred embodiment of the present invention, comprised of twisted-pair wire.

The bus 300 is divided into an auxiliary bus 301, a power bus 302, a downlink bus 303, a timing bus 304 and a combined acoustic/nonacoustic data bus 305. The auxiliary bus 301 is used, among other things to carry signals that are inductively transmitted to one of a plurality of birds (not shown) via a bird coil 310. The power bus 302 carries relatively high voltages (on the order of several hundred volts). A zener diode 311 removes a portion of this voltage in each of the many modules within the array to provide, in a preferred embodiment, 6.8 volts to each module. A divider 312 supplies this voltage to an input on a nonacoustic data unit ("NDU") 318 that embodies the data collection and relay circuit of the present invention. This allows the NDU 318 to detect whether the module is receiving sufficient power and to transmit an indication of the power level to the seismic exploration vehicle 100 of FIG. 1.

For purposes of the present invention, nonacoustic data is defined as all data other than data acquired through the hydrophones. This includes temperature measurements, depth measurements, voltage measurements or NDU status information. In terms of bandwidth of the total amount of data transmitted, nonacoustic data typically makes up about one percent. Therefore, the majority of data transmitted through the array is acoustic data.

The downlink bus 303 receives downlink commands from the seismic exploration vehicle 100, delivering the downlink commands to various components within the array. The timing bus 304 carries synchronizing clock signals throughout each module in the array to allow the components therein to work in concert. The data bus 305 carries both the acoustic data derived from the hydrophones within the array and the nonacoustic data derived from nonacoustic sensors coupled to the NDU 318 in the form of interleaved packets or frames. Data are arranged within the frames in an order representing the module order within the array.

The timing and data buses 304, 305 enter a receiver 315 where frames thereon (derived from aft modules) are buffered and transmitted therefrom into a telemetry data transmission circuit, called for purposes of this discussion a combiner/repeater unit ("CRU") 317, that serves to combine the data in the frames with local acoustic and nonacoustic data derived from the module shown (and buffered in a receiver 316) into revised frames. These revised frames are transmitted to the next module via a driver 313. The CRU 317 also feeds another driver 314 that serves to coordinate the operation of a plurality of acoustic data acquisition units ("DAUs") 319, 320, 321, 322 via a local timing bus 324. Each of the DAUs 319, 320, 321, 322 communicates with a plurality of hydrophones, representationally referenced as hydrophones 323. The output from the DAUs 319, 320, 321, 322 is fed to the receiver 316 for injection into the data stream of frames on the data bus 305 via a local data bus 325.

Also providing data to the receiver 316 is the NDU 318. The NDU 318 receives timing and downlink commands via the local timing bus 324 and supplies nonacoustic data to the receiver 316 via the local data bus 325. Again, the receiver 316 acts as a buffer for the data prior to entering the CRU 317 for injection into the main data stream. In addition to deriving local module voltage from the divider 312, the NDU 318 detects saltwater invasion via permeability sensors ("Rho cells") 326, 327 via respective lines 328, 329.

Figure 4:
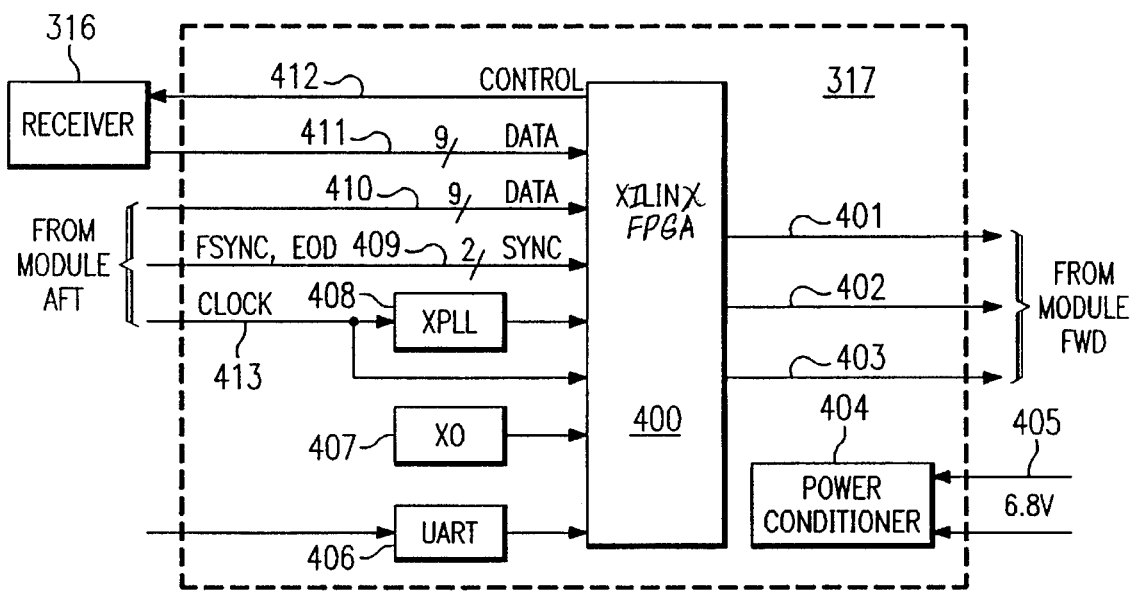
FIG. 4 illustrates a block diagram of a preferred embodiment of the telemetry data transmission circuit of the present invention.

Turning now to FIG. 4 and with continuing reference to FIG. 3, illustrated is a block diagram of a preferred embodiment of the telemetry data transmission circuit of the present invention. The circuit is embodied in the CRU 317 of FIG. 3. At the heart of the CRU is a controller 400 that, in a preferred embodiment of the present invention, is a programmable gate array controller, such as the XC 3042 manufactured by the Xilinx Corporation. Attached hereto and incorporated herein by reference as Exhibit A is a source code listing of the instructions necessary to program the XC 3042 controller 400, via its serial erasable programmable read-only memory ("EPROM"), to operate as a CRU. Those skilled in the art can employ the source code listing to enable the present invention. Other controllers, such as microprocessor-based controllers, are also suitable for use and are within the scope of the present invention. Furthermore, the invention can be embodied in discrete digital or analog components.

The controller 400 transmits data, control and clock signals to a data bus output 401, a frame synchronization bus output 402 and a clock bus output 403 (both outputs tied to the timing bus 304 of FIG. 3) to forward modules or to the seismic exploration vehicle 100 if at the extreme forward end of the streamer. The data bus 401 is, in the illustrated embodiment, a 9-line wide bus, 8 lines of that are devoted to carrying acoustic data generated in the DAUs 319, 320, 321, 322 of FIG. 3 and the remaining 9th line dedicated to carrying nonacoustic data from the NDU 318, also of FIG. 3.

The controller 400 receives power from a power input 405, conditioned within a power conditioner 404. A universal asynchronous receive/transmit ("UART") unit 406 receives downlink commands from the vehicle 100, passing the commands on to the controller 400 as directed.

A local clock source ("XO") 407 provides a local clock signal to the controller 400. In a preferred embodiment, the local clock source 407 is a conventional crystal oscillator designed to provide a consistent, high quality clock signal.

A crystal-controlled phase-locked loop ("XPLL") unit 408 receives a clock bus input 413 and provides a high quality clock signal to the controller that is a function of the frequency of the clock signal (the "master clock signal") present on the clock bus input 413. Thus, the controller slaves to the master clock signal. In the illustrated embodiment, the master clock signal is generated in a module that is aft relative to the illustrated controller and has a frequency of 1.024 MHz. The XPLL 407 produces a 4.096 MHz signal the is divided in a divide-by-4 circuit within the XPLL 407 to yield a 1.024 MHz output clock signal.

The controller also receives a synchronization bus input 409 (from the timing bus 304 of FIG. 3) that carries frame synchronization and end-of-data signals used to synchronize the movement of frames of data along the data bus 305 of FIG. 3 and the addition of local data to the moving frames to maintain data integrity. The controller 400 further receives a data bus input 410 carrying the actual frames of data, 9 bits wide, from aft modules. The clock bus input 413, the synchronization bus input 409 and the data bus input 410 thus are coupled to another CRU in an adjacent aft module via the timing and data buses 304, 305.

Finally, the controller 400 is designed to add local data derived from acoustic and nonacoustic sensors located within the module. Toward this end, local data and control lines 411, 412 allow the controller 400 to command the receiver 316 to transmit data to the controller 400 and to receive the data as they are transmitted from the receiver 316.

The present invention functions when signals on either the timing bus 304 or the data bus 305 are faulty, indicating that an aft module is malfunctioning. As mentioned previously, prior art streamers simply became completely inoperative. With the present invention, the controller 400 monitors the master clock signal, comparing the signal as delivered on the clock bus input 413 to the signal produced by the XPLL 408. If there is a discrepancy, the master clock signal is determined to be faulty. A clock source selection circuit embodied in the controller 400 and detailed in the source code listing of Appendix A then switches to the local clock source 407, ignoring the master clock signal and the synchronization signals and data coming from aft modules. The controller 400 further transmits the local clock signal to the clock bus output 403 and along the timing bus 304, allowing the local clock source 407 to act as a master clock source for forward modules. This allows the synchronization of the remaining forward functioning modules to permit at least that abbreviated portion of the streamer to continue to operate.

Further, the controller 400 monitors the timing and data buses 304, 305 to determine whether the signals thereon are proper. The master clock signal allows the controller 400 to determine when signals should and should not be present on the timing and data buses 304, 305. If the buses 304, 305 are not in conformity with expectation, the controller 400 is likewise programmed to ignore the master clock signal and to employ the local timing source 407 in lieu thereof. When the local clock source 407 serves as the source for synchronization, the controller 400 is programmed to ignore frame and end-of-data signals and data from aft modules.

Those skilled in the art will readily understand that if the illustrated module is at an extreme aft end of the streamer, then the controller 400 does not receive clock, synchronization or data signals, thus the present invention operates to establish the local clock source 407 as the master clock source for the entire streamer. Thus, the aftmost module is preferably of the same design and is interchangeable with any of the other modules in the streamer.

Figure 5:
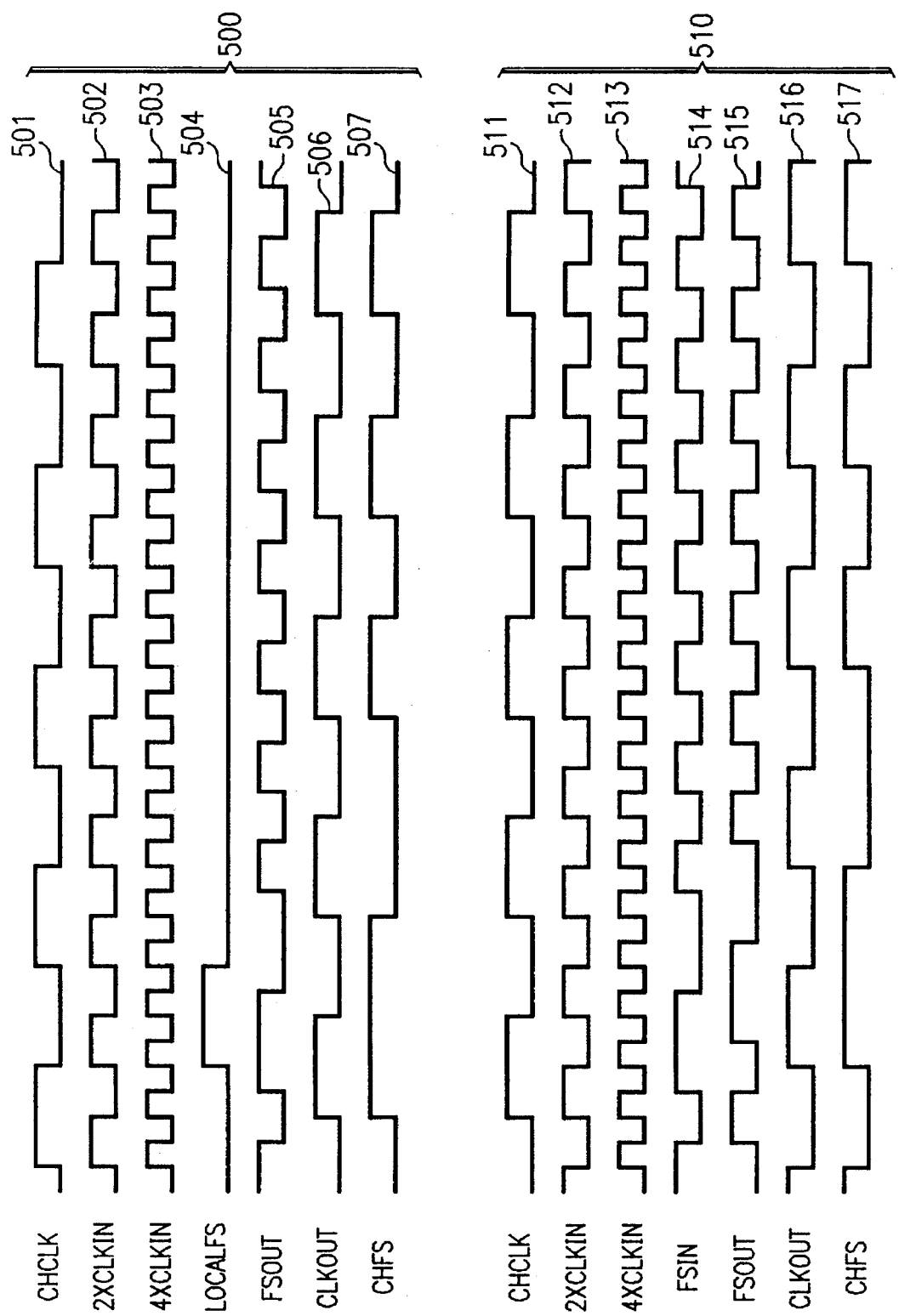
FIG. 5 illustrates a timing diagram of data synchronization signals in the illustrated embodiment of the present invention.

Turning now to FIG. 5, illustrated is a timing diagram of data synchronization signals in the illustrated embodiment of the present invention. A CRU acting as a master CRU produces a group of signals 500. A CRU slaving to the master CRU produces a group of signals 510.

A 1.024 MHz master clock signal is produced when the local clock source 407, internally producing a 4.096 MHz signal 503 is divided by 2 (signal 502) and again divided by 2 (signal 501). Since the CRU is not receiving a frame synchronization signal from an aft CRU, the CRU generates a local frame synchronization signal 504, a master frame synchronization signal 505, a master clock signal 506 that is phase-delayed ½ clock cycle from the signal 501 and a CH frame synchronization signal 507.

If a CRU is slaving to a master CRU, the signals 511, 512, 513, 514, 515, 516, 517 are the same as those signals 501, 502, 503, 504, 505, 506, 507, except that they are all phase-delayed by ½ of a clock cycle. This ½ clock cycle delay is repeated, such that in moving from aft to fore, each CRU is delayed another ½ clock cycle, allowing the frames to be handed from one CRU to another as the data move forward in the streamer.

From the above, it is apparent that the present invention provides a telemetry data transmission circuit for a towed hydrophone streamer comprised of a plurality of series-coupled modules, comprising: (1) a slave clock input in a first module capable of receiving a master timing signal from a master clock source located in a second module, the master timing signal capable of synchronizing an operation of the transmission circuit to allow the transmission circuit to place local telemetry data on a data bus coupled to the transmission circuit and running a length of the streamer, (2) a local clock input in the first module capable of receiving a local timing signal from a local clock source located in the first module, the local timing signal alternatively capable of synchronizing the operation of the transmission circuit and (3) a clock source selection circuit capable of allowing the local clock source to synchronize the operation of the transmission circuit as a function of a condition of the master timing signal.

Although the present invention and its advantages have been described in detail, it should be understood that various changes, substitutions and alterations can be made herein without departing from the spirit and scope of the invention as defined by the appended claims.

What is claimed is:

1. A telemetry data transmission circuit for a towed hydrophone streamer comprised of a first module and a second module, said first module and said second module interchangeable within said streamer, comprising:

a slave clock input in said second module capable of receiving a master timing signal from a master clock source located in said first module, said master timing signal capable of synchronizing an operation of said data transmission circuit to allow said transmission circuit to place telemetry data from said second module on a data bus coupled to said transmission circuit and running a length of said streamer;

a local clock input in said second module capable of receiving a local timing signal from a local clock source located in said second module, said local timing signal alternatively capable of synchronizing said operation of said transmission circuit; and a clock source selection circuit in said second module capable of allowing said local clock source to synchronize said operation of said transmission circuit as a function of a condition of said master timing signal, a controller in said second module ignoring said master timing signal and any telemetry data received from said first module when said master timing signal is faulty, said controller allowing said transmission circuit to continue to place said telemetry data from said second module on said data bus.

2. The circuit as recited in claim 1 wherein said local timing signal is transmitted to a third module, said local clock source serving as a master clock source for a transmission circuit in said third module.

3. The circuit as recited in claim 1 wherein said selection circuit allows said local clock source to synchronize said operation of said transmission circuit as a function of a condition of said any telemetry data on said data bus.

4. The circuit as recited in claim 1 wherein said selection circuit allows said local clock source to synchronize said operation of said transmission circuit as a function of a condition of a frame synchronization signal.

5. The circuit as recited in claim 1 wherein said transmission circuit receives a frame of telemetry data on said data bus and retransmits said data on said data bus, adding said local telemetry data to said frame during said retransmission.

6. The circuit as recited in claim 1 wherein said local telemetry data is received from hydrophones in said hydrophone streamer.

7. The circuit as recited in claim 1 wherein said first module is proximate a towing vessel and said second module is distal from said vessel.

8. The circuit as recited in claim 1 wherein said data bus comprises a channel for nonacoustic data.

9. The circuit as recited in claim 1 wherein said first module further comprises a plurality of hydrophones coupled to said transmission circuit via a data receiver.

10. The circuit as recited in claim 1 wherein said transmission circuit is embodied in a programmable logic array.

11. A method of synchronizing an operation of a telemetry data transmission circuit in a towed hydrophone streamer comprised of a first module and a second module, said first module and said second module interchangeable within said streamer, comprising the steps of:

receiving a master timing signal from a master clock source located in said first module into a slave dock input in said second module, said master timing signal capable of synchronizing said operation of said transmission circuit to allow said transmission circuit to place telemetry data from said second module on a data bus coupled to said transmission circuit and running a length of said streamer;

receiving a local timing signal from a local clock source located in said second module into a local clock input in said second module, said local timing signal alternatively capable of synchronizing said operation of said transmission circuit; and allowing said local clock source to synchronize said operation of said transmission circuit as a function of a condition of said master timing signal with a clock source selection circuit.

12. The method as recited in claim 11 further comprising the step of transmitting said local timing signal to a third module, said local clock source serving as a master clock source for a transmission circuit in said third module.

13. The method as recited in claim 11 further comprising the step of allowing said local clock source to synchronize said operation of said transmission circuit as a function of a condition of said any telemetry data on said data bus.

14. The method as recited in claim 11 further comprising the step of allowing said local clock source to synchronize said operation of said transmission circuit as a function of a condition of a frame synchronization signal.

15. The method as recited in claim 11 further comprising the steps of receiving a frame of telemetry data on said data bus and retransmitting said data on said data bus with said transmission circuit, said transmission circuit adding said local telemetry data to said frame during said retransmission.

16. The method as recited in claim 11 further comprising the step of receiving said local telemetry data from hydrophones in said hydrophone streamer.

17. The method as recited in claim 11 wherein said first module is proximate a towing vessel and said second module is distal from said vessel.

18. The method as recited in claim 11 wherein said data bus comprises a channel for nonacoustic data.

19. The method as recited in claim 11 wherein said first module further comprises a plurality of hydrophones coupled to said transmission circuit via a data receiver.

20. The method as recited in claim 11 wherein said transmission circuit is embodied in a programmable logic array.

21. A towed acoustic streamer, comprising:

a plurality of interchangeable modules connected in series, each of said modules containing a plurality of hydrophones and a data bus running a length of said each of said modules, said data bus coupled to recording equipment onboard a towing vessel, said towing vessel coupled to a forward end of said streamer, each of said modules further containing a telemetry data transmission circuit including:

a slave clock input capable of receiving a master timing signal from a master clock source located in another module, said master timing signal capable of synchronizing an operation of said transmission circuit to allow said transmission circuit to place local telemetry data from said plurality of hydrophones on said data bus;

a local clock input capable of receiving a local timing signal from a local clock source, said local timing signal alternatively capable of synchronizing said operation of said transmission circuit; and a clock source selection circuit capable of allowing said local clock source to synchronize said operation of said transmission circuit as a function of a condition of said master timing signal, said each of said modules receiving said master clock signal from an aftmost functioning module, said clock selection circuit allowing a module forward of said aftmost module to generate said master clock signal when said aftmost module is faulty.

22. The streamer as recited in claim 21 wherein said local timing signal is transmitted to forward modules, said local clock source serving as a master clock source for forward transmission circuits.

23. The streamer as recited in claim 21 wherein said selection circuit allows said local clock source to synchronize said operation of said transmission circuit as a function of a condition of said any telemetry data on said data bus.

24. The streamer as recited in claim 21 wherein said selection circuit allows said local clock source to synchronize said operation of said transmission circuit as a function of a condition of a frame synchronization signal.

25. The streamer as recited in claim 21 wherein said transmission circuit receives a frame of telemetry data on said data bus and retransmits said data on said data bus, adding said local telemetry data to said frame during said retransmission.

26. The streamer as recited in claim 21 wherein said data bus comprises a channel for nonacoustic data.

27. The streamer as recited in claim 21 wherein said transmission circuit is embodied in a programmable logic array.

* * * * *

UNITED STATES PATENT AND TRADEMARK OFFICE
CERTIFICATE OF CORRECTION

PATENT NO. : 5,583,824
DATED : December 10, 1996
INVENTOR(S) : Deane D. Fletcher It is certified that error appears in the above-indentified patent and that said Letters Patent is hereby corrected as shown below:

Col. 9, line 65, "dock" should be --clock--.

Signed and Sealed this

Eleventh Day of March, 1997

Attest:

BRUCE LEHMAN

*Attesting Officer*     *Commissioner of Patents and Trademarks*